(12) United States Patent
Chelaidite (10) Patent No.: US 9,989,114 B2
(45) Date of Patent: Jun. 5, 2018

(54) POWER TRANSFER MECHANISM FOR A PARKING BRAKE ASSEMBLY

(71) Applicant: Akebono Brake Industry Co., Ltd., Chuo-ku, Tokyo (JP)

(72) Inventor: Galus Chelaidite, South Lyon, MI (US)

(73) Assignee: AKEBONO BRAKE INDUSTRY CO., LTD, Tokyo (JP)

(*) Notice: Subject to any disclaimer, the term of this patent is extended or adjusted under 35 U.S.C. 154(b) by 53 days.

(21) Appl. No.: 15/192,461

(22) Filed: Jun. 24, 2016

(65) Prior Publication Data
US 2017/0370433 A1 Dec. 28, 2017

(51) Int. Cl.
| | |
|---|---|
| F16D 65/18 | (2006.01) |
| F16D 55/225 | (2006.01) |
| F16D 67/02 | (2006.01) |
| F16D 121/24 | (2012.01) |
| F16D 125/42 | (2012.01) |

(52) U.S. Cl.
CPC ........... *F16D 65/18* (2013.01); *F16D 55/225* (2013.01); *F16D 67/02* (2013.01); *F16D 2121/24* (2013.01); *F16D 2125/42* (2013.01)

(58) Field of Classification Search
CPC .... F16D 55/225; F16D 55/2255; F16D 65/14; F16D 65/18; F16D 65/183; F16D 67/02; F16D 2055/0091; F16D 2121/24; F16D 2125/20; F16D 2125/40; F16D 2125/42; F16D 2125/48
USPC .............................. 188/71.2, 72.3, 72.4, 72.6
See application file for complete search history.

(56) References Cited

U.S. PATENT DOCUMENTS

| | | | | |
|---|---|---|---|---|
| 4,809,824 A * | 3/1989 | Fargier | ...................... | B60T 8/32 |
| | | | | 188/106 P |
| 5,769,189 A * | 6/1998 | Heibel | .................. | B60T 11/046 |
| | | | | 188/106 P |
| 6,915,883 B2 * | 7/2005 | Watanabe | ............... | B60T 1/005 |
| | | | | 188/156 |
| 8,181,750 B2 * | 5/2012 | Homma | .................. | F16D 55/30 |
| | | | | 188/152 |
| 8,205,725 B2 * | 6/2012 | Sakashita | .............. | F16D 65/183 |
| | | | | 188/158 |
| 9,188,182 B2 * | 11/2015 | Park | ........................ | F16D 65/18 |
| 9,353,811 B2 * | 5/2016 | Gutelius | .................. | F16D 65/18 |
| 9,476,469 B2 * | 10/2016 | Gutelius | ................. | F16D 65/14 |
| 9,476,470 B2 * | 10/2016 | Park | ...................... | F16D 55/225 |
| 9,587,692 B2 * | 3/2017 | Gutelius | ................. | F16D 65/18 |
| 9,879,739 B2 * | 1/2018 | Gutelius | ............. | F16D 65/0068 |

(Continued)

*Primary Examiner* — Thomas W Irvin
(74) *Attorney, Agent, or Firm* — The Dobrusin Law Firm, P.C.

(57) ABSTRACT

A brake assembly including a first brake piston; a second brake piston; and a parking brake assembly. The parking brake assembly includes a power transfer mechanism and a motor providing power to the power transfer mechanism. During a parking brake apply, the power transfer mechanism provides the power to both the first brake piston and the second brake piston so that both the first brake piston and the second brake piston are moved until a resistance of the second brake piston becomes higher than a resistance of the first brake piston. The power transfer mechanism then transfers the power from the second brake piston to the first brake piston so that the second brake piston ceases to move and additional power is supplied to the first brake piston.

20 Claims, 2 Drawing Sheets

(56) References Cited

U.S. PATENT DOCUMENTS

| | | | | |
|---|---|---|---|---|
| 2004/0168867 A1* | 9/2004 | Kerscher | ............... | B61H 13/04 |
| | | | | 188/72.6 |
| 2014/0034432 A1* | 2/2014 | Bull | ..................... | B60T 13/741 |
| | | | | 188/106 R |
| 2015/0129371 A1* | 5/2015 | Gutelius | ................ | F16D 65/18 |
| | | | | 188/72.6 |
| 2015/0144438 A1* | 5/2015 | Park | ....................... | F16D 65/18 |
| | | | | 188/72.1 |
| 2015/0204402 A1* | 7/2015 | Gutelius | ................ | F16D 65/14 |
| | | | | 188/162 |
| 2015/0354650 A1* | 12/2015 | Bull | ....................... | F16D 65/18 |
| | | | | 188/162 |
| 2015/0354651 A1* | 12/2015 | Park | ....................... | F16D 55/225 |
| | | | | 188/72.1 |
| 2016/0238094 A1* | 8/2016 | Gutelius | ................ | F16D 65/18 |
| 2016/0290424 A1* | 10/2016 | Gutelius | ................ | F16D 65/18 |
| 2017/0106848 A1* | 4/2017 | Ritter | ................... | B60T 13/741 |

* cited by examiner

POWER TRANSFER MECHANISM FOR A PARKING BRAKE ASSEMBLY

FIELD

These teachings relate to a parking brake assembly. More particularly, these teachings provide a power transfer mechanism for a parking brake assembly.

BACKGROUND

A service brake or brake assembly, such as a disc brake assembly, may include a brake caliper and inboard and outboard brake pads located on opposing sides of a brake rotor. The brake caliper may include one or more brake piston bores, each of which may house a brake piston that moves during a brake apply and during release of a brake apply. During a brake apply to decelerate a vehicle, brake fluid is pressurized, which causes one or more of the brake pistons to move into contact with the inboard brake pad and then move the inboard brake pad into contact with one side of the brake rotor, while an opposing brake pad is moved into contact with the opposing side of the brake rotor.

When a vehicle is already stopped or in a parked position, a parking brake assembly may be used to prevent movement of the vehicle. The parking brake assembly may utilize one or more components of the brake assembly to create a clamping force to prevent movement of the vehicle. During a parking brake apply, the parking brake assembly may cause one or more of the brake pistons of the service brake to move so that the brake pads are moved into contact with the brake rotor to create and maintain the clamping force.

Some vehicles, including passenger cars and trucks, use single brake piston hydraulic brake assemblies for vehicle deceleration. These vehicles may also have a parking brake assembly that utilizes the same single brake piston for creating clamping force to maintain the vehicle in a stopped or parked position. In such parking brake assemblies, an electric motor may generate torque to move the brake piston and therefore the brake pads against the brake rotor to create the parking brake force.

Other vehicle platforms, like full-size trucks, vans, and SUVs, use multi-brake piston brake assemblies for vehicle deceleration only, and a separate parking brake assembly for maintaining the vehicle in a parked position.

To improve parking brake performance, while also reducing weight, costs, and packaging space, in some vehicle platforms such as full-size trucks, vans, and SUVs, it may be desirable to have a parking brake assembly that utilizes an existing multi-brake piston brake assembly. It may be desirable to have a parking brake assembly that utilizes an existing multi-brake piston brake assembly without requiring a super high output motor to move the brake pistons and the brake pads against the brake rotor to create the clamping force. For example, it may be attractive to have a parking brake assembly for a heavy-duty vehicle platform with a multi-brake piston brake assembly that can use a motor from a light-duty vehicle platform to sufficiently move the brake pistons and brake pads against a brake rotor to create sufficient clamping force.

SUMMARY

The present teachings provide a parking brake assembly. More particularly, the description herein relates to devices for parking brake assemblies. The present teachings may be used with a service brake assembly and/or a parking brake assembly in any vehicle. The parking brake assembly may use one or more components of the service brake assembly. The teachings herein can be used in applications including light duty and/or heavy duty car, truck, bus, train, airplane, all-terrain vehicle, etc. The present teachings may also be used in non-vehicular applications. For example, the teachings herein may be applied to brake assemblies used in various machines, such as a lathe, a winder for paper products or cloth, amusement park rides, wind turbines, or the like.

A brake assembly is provided that comprises a first brake piston; a second brake piston; and a parking brake assembly. The parking brake assembly comprises a power transfer mechanism; and a motor providing power to the power transfer mechanism. The power transfer mechanism comprises a first axle having a first clutch; a second axle having a second clutch; and a conical component including a first cone and a second cone. The first axle is in communication with the first brake piston, and the second axle is in communication with the second brake piston. For the purposes of clarity, applying the parking brake may be described as occurring during or over one or more operating stages. For example, the parking brake may be described as being applied during a first or low-load operating stage and a second or high-load operating stage.

During the first or low-load operating stage, the motor rotates the conical component (i.e., both the first and second cone). The first axle becomes frictionally engaged with the first cone via the first clutch, and the second axle becomes frictionally engaged with the second cone via the second clutch so that both axles are rotated together with the conical component as a single, solid axle as the motor rotates the conical component. The contact or frictional engagement between the first cone and first clutch and the second cone and second cone is dependent on a load being present; otherwise, the first cone and the first clutch and the second cone and the second clutch would be fictionally disengaged. During this rotation, a gap may be defined between the first axle and the first cone, and another gap may be defined between the second axle and the second cone. More specifically, during this rotation, a gap may be defined between an edge of a first axle head and an edge of the first cone, and/or a gap may be defined between an edge of a second axle head and an edge of the second cone. During this rotation, the first brake piston and the second brake piston are moved towards the inboard brake pad and any gaps between the brake pistons and the inboard brake pad are taken up or eliminated. A gap at the trailing end (i.e., a gap defined between the second brake piston and the inboard brake pad) may smaller than a gap at the leading end (i.e., a gap defined between the first brake piston and the inboard brake pad) thus resulting in the trailing end gap being taken up or eliminated first. After the trailing end gap is eliminated, continued rotation of the second axle (the first axle is still also rotated at this point) results in an increased thrust load or force (i.e., second thrust force as used throughout the description and claims) at the second axle, which causes the second axle to axially move in a direction towards the second cone, which thus causes both the first axle and the conical component to axially move in a direction away from the second axle until the second clutch slips thus resulting in the second axle and second cone at least partially frictionally disengaging so that the second brake piston is no longer moved. Meanwhile, the first axle and the first cone remain frictionally engaged via the first clutch so that the first brake piston continues to be moved towards the inboard brake pad until the leading end gap is also eliminated.

After both the leading and trailing end gaps are eliminated, during the second or higher-load stage continued rotation of the first axle eventually results in an increased thrust load or force (i.e., a first thrust load as used throughout the description and claims) at the first axle, which cause the first axle to move axially in a direction towards the first cone, which causes both the second axle and the conical component to axially move in a direction away from the first axle. The opposing first and second thrust forces continue to increase thus resulting in the first and second axles to be axially moved towards one another and deeper into the corresponding cones until cone-to-cone contact is made between the first cone and the first axle at a contact location and cone-to-cone contact is made between the second cone and the second axle at a contact location. With cone-to-cone contact at both respective axles and cones, continued rotation of the conical component causes both axles to again rotate together as a single, solid axle so that both brake pistons move the corresponding ends of the inboard brake pad against the brake rotor to develop the clamping force. As the clamping force increases in correspondence to the movement of the brake pistons and the inboard brake pad against the rotor, the clamping force is monitored, and once a desired clamping force is achieved, the motor may cease rotating the conical component.

A brake assembly including a first brake piston; a second brake piston; and a parking brake assembly. The parking brake assembly includes a power transfer mechanism and a motor providing power to the power transfer mechanism. During a parking brake apply, the power transfer mechanism provides the power to both the first brake piston and the second brake piston so that both the first brake piston and the second brake piston are moved until a resistance of the second brake piston becomes higher than a resistance of the first brake piston. The power transfer mechanism then transfers the power from the second brake piston to the first brake piston so that the second brake piston ceases to move and additional power is supplied to the first brake piston.

A brake assembly is provided that comprises a first brake piston, a second brake piston, and a parking brake assembly. The parking brake assembly comprises a power transfer mechanism and a motor. The power transfer mechanism comprises a conical component that includes a first cone and a second cone. The first cone is frictionally engageable with a first axle, and the second cone is frictionally engageable with a second axle. The first axle is in communication with the first brake piston, and the second axle is in communication with the second brake piston. During a parking brake apply, the first cone becomes frictionally engaged with the first axle via a first clutch and the second cone becomes frictionally engaged with the second axle via a second clutch so that the power transfer mechanism provides the power to both the first axle and the second axle so that both the first brake piston and the second brake piston are moved until a resistance of the second brake piston becomes higher than a resistance of the first brake piston. When the resistance of the second brake piston becomes higher than the resistance of the first brake piston, the second clutch slips so that the second axle at least partially frictionally disengages with the second cone so that power ceases to be provided to the second axle so that the second brake piston ceases to move and additional power is supplied to the first axle and the first brake piston so that the first brake piston continues to move.

A method of applying a parking brake is provided. The method comprises providing power to both a first brake piston and a second brake piston so that both of the first brake piston and the second brake piston are moved. The method also comprises transferring the power from the second brake piston to the first brake piston with a power transfer mechanism when a resistance of the second brake piston becomes higher than a resistance of the first brake piston so that the second brake piston ceases to move and additional power is supplied to the first brake piston. The power transfer mechanism comprises a first clutch and a second clutch, a first cone and a second cone, the first cone is engageable with a first axle that is in communication with the first brake piston, and the second cone is engageable with a second axle that is in communication with the second brake piston.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The teachings herein provide a brake assembly. The brake assembly may be any system or assembly for creating a clamping force. The brake assembly may function to create a clamping force and/or brake apply to slow, stop, and/or maintain a vehicle in a stopped position. The brake assembly may be any type of brake assembly. For example, the brake assembly may be an opposing brake assembly (i.e., a fixed caliper brake assembly) or a floating brake assembly (i.e., a floating caliper). The brake assembly may be a service brake, assembly. The brake assembly may generally include a brake rotor, one or more brake pads, and a brake caliper supporting one or more brake pistons. A parking brake assembly may be added to or integrated with the brake assembly. The parking brake assembly may be an ancillary assembly or system added to, or incorporated with, the brake assembly.

The clamping force may be a force that, when coupled with a brake pad coefficient of friction, functions to decelerate, slow, stop, and/or prevent movement or rotation of a brake rotor and/or a vehicle. The clamping force may be created during a standard brake apply (i.e., a brake apply force). The clamping force may be created during a parking brake apply (i.e., a parking brake force).

The brake rotor may cooperate with the components of the brake assembly, the parking brake assembly, or both to create the clamping force. The brake rotor may include an inboard side and an opposing outboard side. The brake caliper may have one or more brake pads located at the inboard side of the brake rotor (i.e., inboard brake pads), one or more brake pads at the outboard side of the brake rotor (i.e., outboard brake pads), or both. The brake caliper may have one or more brake pistons located at the inboard side, one or more brake pistons located at the outboard side, or both. When a vehicle is in motion, the brake rotor may rotate with a wheel and about an axle of a vehicle. To create the clamping force during a standard brake apply, or during a parking brake apply, the friction material of one or more brake pads can be moved or pushed against at least one of the sides of the brake rotor. After the clamping force is created, the brake rotor may be restricted from moving and/or rotating, and, accordingly, the vehicle may be slowed, stopped, and/or restricted from moving. To release the clamping force, the friction material of the one or more brake pads can be moved away from the brake rotor to release the clamping force. After the clamping force has been released, the brake rotor and, accordingly, the vehicle may move again.

One or more brake pads may be used to create the clamping force. The clamping force can be created by converting the kinetic energy of the vehicle into thermal energy by frictionally engaging one or more brake pads with one or more sides of the brake rotor. The one or more brake pads may include one or more features (i.e. ears, projections, etc.) that may engage or be engaged by a brake caliper, a support bracket, or both to maintain the location of the brake pads within the braking system and relative to the brake rotor.

The one or more brake pads may include a friction material and a pressure plate. The one or more brake pads may be supported on the brake caliper so that the friction material faces a side of the brake rotor. The pressure plate may oppose the friction surface. One or more brake pistons or one or more brake caliper fingers may be in selective contact with the pressure plate of a corresponding brake pad. For example, in some cases, one or more brake pistons may be in contact with the pressure plate of an inboard brake pad, and one or more brake caliper fingers may be in contact with the pressure plate of an outboard brake pad, or vice versa. In some cases, one or more brake pistons may be in contact with the pressure place of an inboard brake pad, and one or more brake pistons may be in contact with the pressure place of an outboard brake piston. During a brake apply, or while applying the parking brake, the one or more brake pistons and/or the one or more fingers can move all or an end of a corresponding brake pad so that the corresponding friction material engages a corresponding side of the brake rotor to create the clamping force.

The one or more brake pads may comprise one or more inboard brake pads that are moveable towards and away from an inboard side of the brake rotor. The one or more brake pads may comprise one or more outboard brake pads that are moveable towards and away from an outboard side of the brake rotor. When the brake assembly, the parking brake assembly, or both are applied or released, the brake pads (e.g., the inboard and outboard pads), or portions thereof can be moved relative to the brake rotor together, individually, sequentially, or a combination thereof. In other words, the brake pads can be moved towards and/or away from the brake rotor at the same time, or one or more brake pads can be moved before one or more other brake pads are moved. A first end of a brake pad (i.e., a leading end) may be moved towards or away from the brake rotor together, individually, sequentially, before, after, or in any combination thereof with a second end of the same brake pad (i.e., a trailing end).

The distance that the one or more of the brake pads are moved, or the distance that the ends of one or more brake pads must be moved relative to the brake rotor to create the clamping force may vary depending on taper wear. Taper wear may be defined as the tendency of the friction material of a brake pad to wear unevenly during use. Taper wear may result in the inboard, outboard or both pressure plates of the inboard, outboard or both brake pads no longer being parallel to the sides of a brake rotor. For example, during a brake apply, a parking brake apply, or both, a first end (i.e., a leading end) of a brake pad may contact the brake rotor first and/or with greater force than the second end of the brake pad (i.e., a trailing end), or vice versa. This may cause the first end to wear more, or wear faster, than the second end, or vice versa. Over time, the first end of a brake pad will have moved a greater distance than the second end, or vice versa, to engage the brake rotor and create the clamping force.

The brake caliper may function to support one or more the components of the brake assembly, one or more the components of the parking brake assembly, or both. For example, the brake caliper may include one or more supports configured to engage and/or support the one or more brake pads. The brake caliper may provide for one or more brake pads, or, preferably, two or more brake pads to move relative to the brake rotor. The brake caliper may move during a brake apply (i.e., a floating caliper), or the brake caliper may be fixed so that the brake caliper does not move during a brake apply (i.e., a fixed caliper). The brake caliper may be connected to any non-rotating or moving part of a vehicle, like a support or a knuckle.

The brake caliper may have one or more piston bores. Each piston bore may define one or more hollow regions in the brake caliper configured to receive and support a corresponding brake piston. Some brake calipers have two or more piston bores. The piston bores can be located on only one side of the brake rotor, or on both sides of the brake rotor. Each piston bore includes a piston bore axis. The piston bore axis may extend generally perpendicular to a side of the brake rotor. A brake piston supported within a piston bore may be moved along the piston bore axis to create or release a clamping force.

The one or more brake pistons may function to move a brake pad, or a corresponding end of brake pad, towards the brake rotor to create the clamping force. During a brake apply to decelerate or stop a vehicle, the brake pistons may be moved by pressurizing fluid, such as brake fluid. To release the clamping force or the brake apply, the brake piston can be moved by depressurizing the fluid. During a parking brake apply, to create clamping force the brake piston may be moved by moving a corresponding rotary to linear stage mechanism in an apply direction. To release the clamping force or the parking brake, the brake piston can be moved by moving the corresponding rotary to linear stage mechanism in an opposing release direction. During both a parking brake apply and a standard brake apply, the brake piston may be moved along a brake piston axis, which may be collinear or essentially collinear with the piston bore axis. The brake piston may include a closed end selectively engaging the pressure plate of an inboard brake pad and an open end defining an opening into a brake piston pocket.

The brake piston pocket may function to receive at least a portion of a corresponding rotary to linear stage mechanism. The brake piston pocket may be a cup or recess formed into an end of a brake piston. The brake piston pocket may include a bottom wall at the end or bottom of the brake piston pocket. A gap may exist between the rotary to linear stage mechanism and a corresponding bottom wall. During a parking brake apply, the gap may be taken up by moving the rotary to linear stage mechanism towards the bottom wall. Once the gap is taken up, further movement of the rotary to linear stage mechanism may cause the rotary to linear stage mechanism to press against the bottom wall and then move the brake piston and thus brake pad against the brake rotor to create the clamping force.

A parking brake assembly may be added or integrated with the brake assembly. The parking brake assembly may function to create a clamping force to maintain a vehicle in a stopped or parked position. The parking brake assembly may utilize one or more components of the brake assembly to create the clamping force, parking brake force, or both. For example, during a parking brake apply, the one or more brake pistons and the brake pads may be moved against the brake rotor to create the clamping force. The one or more brake pistons and the brake pads may be moved away from the brake rotor to release the clamping force. The parking brake assembly may comprise a motor gear unit (MGU).

The motor gear unit (MGU) may function to create or generate and then transfer a force or torque suitable for creating and/or releasing a clamping force. During application of the parking brake, to create a clamping force, the MGU may function to generate torque sufficient to move the one or more rotary to linear stage mechanisms, the one or more brake pistons, the one or more brake pads, or a combination thereof toward the brake rotor thus creating drag which acts to prevent vehicle wheel rotation. During release of the parking brake to release the clamping force, the MGU may function to generate torque sufficient to move the one or more rotary to linear stage mechanisms, the one or more brake pistons, or both away from the one or more brake pads so that the brake pads move away from the brake rotor thus releasing the clamping force. The motor gear unit (MGU) may be any device or combination of devices that may function to perform one or more of the aforementioned functions.

At least a portion of the MGU may be contained within a housing. The housing may be integrally formal with the brake caliper; removably attached to the brake caliper; permanently attached to the brake caliper; or attached in any suitable way to any part of a vehicle, such as a support, support bracket, or knuckle. Preferably, the MGU is contained within a housing, which can be attached to a brake assembly with one or more suitable fasteners. The housing containing the MGU may be attached to the brake assembly after the brake assembly has been assembled. The housing containing the MGU may be attached to the brake assembly, separated from the brake assembly to service one or more components of the brake assembly, the parking brake assembly, or both, and then reassembly the housing to the brake assembly. The motor gear unit (MGU) may include a motor, one or more gears or gear trains, one or more power transfer mechanisms, one or more rotary to linear stage mechanisms, or a combination thereof.

The motor may be any suitable motor for creating a force or torque. For example, the motor may be a DC motor, a brushless motor, a series wound motor, a shunt wound motor, a compound wound motor, a separately exited motor, a servomotor, a stepping motor, or a permanent magnet motor.

The motor gear unit (MGU) may include one or more gears or gear trains that may function to transfer, increase, and/or decrease a power output of the motor. The gear train may include one or more suitable gears. For example, the one or more gears may include one or more gears in communication with a power transfer mechanism to cause the power transfer mechanism to rotate in an apply direction to apply a parking brake and a release direction during release of a parking brake.

The motor gear unit (MGU) may include a power transfer mechanism. During a parking brake apply or release of the parking brake, the power transfer mechanism may function to distribute or transfer power generated by the motor and/or gear train between the one or more brake pistons. For example, during a parking brake apply or release of the parking brake, the power transfer mechanism may function to distribute or transfer power to a brake piston experiencing the least or a lesser amount of resistance relative to other brake pistons. For example, during a parking brake apply or release of the parking brake, the power transfer mechanism may function to distribute or transfer all of the power to the leading brake piston or to the trailing brake piston. For example, during a parking brake apply or release of the parking brake, the power transfer mechanism may function to distribute or transfer some of the power to the leading brake piston and some of the power to the trailing brake piston. For example, during a parking brake apply or release of the parking brake, the power transfer mechanism may function to distribute or transfer an equal amount of power to the leading brake piston and the trailing brake piston. For example, during a parking brake apply or release of the parking brake, the power transfer mechanism may function to distribute or transfer power to one or more first brake pistons without distributing or transferring power to one or more second brake pistons, and then distribute or transfer power to the one or more second brake pistons without transferring power to the one or more first brake pistons. The power transfer mechanism may include one or more conical components, one or more gears, one or more axles, one or more rotary to linear stage mechanisms, or a combination thereof. The power transfer mechanism may function similar to a rack and pinion mechanism. The power transfer mechanism may be a mechanism system or assembly that is free of a differential.

As used throughout this description, load or resistance at a brake piston may increase while generating a clamping force during a parking brake apply. Because the one or more brake pistons are individually moveable, the load or resistance at each of the brake pistons may be different, or not always the same. It is therefore a function of the power transfer mechanism to transfer or redistribute power from a brake piston having a higher resistance to a brake piston having a lower resistance. During some operating stages of applying the parking brake, the power transfer mechanism may function to distribute power to both axles and brake pistons. For example, this may occur during a first or low-load stage during elimination of gaps between the one or more brake pistons and a brake pad. This may also occur during a second or high-load stage when opposing thrust forces are increasing as the clamping force is being created.

The power transfer mechanism may include a conical component. The conical component may include one or more cones. The conical component, the one or more cones, or both may function to distribute or transfer the power to one or more of the axles, axle heads, worm wheels, brake pistons, or a combination thereof. The one or more cones may engage an axle or axle head via a clutch to transfer power to that axle, axle head, and/or worm wheel or brake piston in communication with that axle. The one or more cones may disengage an axle or axle head (e.g., a corresponding clutch may slip) to cease transfer of power to that axle, axle head, and/or gear or brake piston in communication with that axle. The one or more cones may engage one or both of the axles, axle heads or both at the same time. The one or more cones may comprise a first cone and a second cone. The first and second cones may be an integral component defining the conical component, or may be individual components that are joined together to define the conical component.

Figure 4:
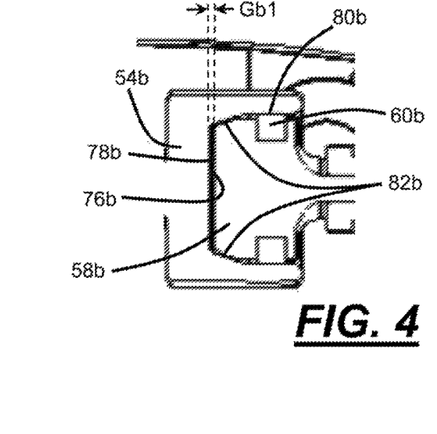
FIG. 4 is a close-up view of a portion of the parking brake assembly of FIG. 3 at 4.

The one or more cones may be cone or cup shaped. The walls of the one or more cones may one or more contact portions. For example, each cones may have a first contact portion that can be frictionally engaged and disengaged (e.g., slip) by a corresponding clutch, which may occur during a first or low-load stage when the thrust forces are lower when compared to the second stage. Each cone may also have a second contact portion which may have tapered or angled surfaces so that the corresponding axle heads, which may also have corresponding tapered or angled surfaces, can engage the cones via cone-to-cone contact, which may occur during a second or high-load stage when opposing thrust forces axially move the axles towards each other and deeper into the corresponding cones. One or more of the cones and/or corresponding clutches may be elastic, deflectable, and/or deformable so that the axles can move towards each other and deeper into the corresponding cones. As can be seen in FIG. 4, the second contact portion has a greater slope compared to the first contact portion.

The conical component, the one or more cones, or a combination thereof may be axially moveable relative to the one or more worm wheels, axles, or both. For example, the conical component and/or the one or more cones may translate side to side, pivot, bend, and/or flex so that a clutch on an axle head can frictionally engage or disengage a corresponding cone. For example, the conical component and/or the one or more cones may translate side to side, pivot, bend, and/or flex so that an axle head can engage or disengage the corresponding cone at a second contact point. The conical component and/or the one or more cones may be elastic, bendable, deformable, deflectable, resilient or a combination thereof. The conical component and/or the one or more cones may be substantially rigid and/or non-bendable, deformable, deflectable, or a combination thereof. The conical component and/or the one or more cones may be attached to the housing or caliper with a basing element or spring thus allowing the cones to move but return to a home position during steady state. The conical component and/or the one or more cones may be in communication with the gear train, one or more gears, the motor, or a combination thereof.

The power transfer mechanism may include one or more axles and one or more axle heads. The one or more axles and/or axle heads may function to transfer power from the motor, gear train, cone, or a combination thereof to a corresponding worm wheel. The one or more axles, axle heads, or both may function to engage and disengage a corresponding cone. The one or more axles may rotate when the corresponding axle or axle head is engaged with a corresponding cone. The one or more axles or axle heads may be frictionally engaged with a corresponding cone when the corresponding brake piston is subjected to less resistance than another brake piston. The one or more axles may cease to rotate when the corresponding axle head is not engaged with a corresponding cone or when the engagement between an axle head and corresponding cone slips.

The one or more axles or axle heads may be disengaged with a corresponding cone when the corresponding brake piston is subjected to resistance than another brake piston. The one or more axles may rotate when engaged by a corresponding cone at a location where the axle heads and cones are correspondingly tapered or angled. Both axles may rotate together as a solid locked axle when each axle head is frictionally engaged with a corresponding cone at a location where the axle heads and cones are correspondingly tapered or angled. Thrust forces acting on a cone may cause the frictional engagement between an axle head and corresponding cone. The one or more axles may move or translate axially as a result of thrust forces. The one or more axle heads may be located at an end of an axle. The one or more axle heads may have a diameter that is larger, smaller, or the same size as the corresponding axel. The one or more axle heads may be an integral part of the corresponding axle.

The one or more axle heads, the one or more cones, or both may include a one or more clutches. The one or more clutches may function to create an engagement between a cone and a corresponding axle and/or axle head. In this regard, when frictionally engaged via a clutch, rotation of the conical component may cause a corresponding axle and axle head to rotate, which may therefore cause a corresponding worm gear and brake piston to move. Accordingly, when the clutch clips or at least partially frictionally disengages a corresponding cone, the corresponding axle and axle head may not rotate, and as such the corresponding worm gear and brake piston may not move or cease moving. In some instances, when the resistance on both brake pistons is equal and low, the clutch corresponding to a leading brake piston and a clutch corresponding to a trailing brake piston may both deflect to allow both cones to engage so that both axles rotate as a solid axle. Accordingly, both worm gears, and therefore both brake pistons can move. The clutch may be formed by any suitable material or geometry. For example, the clutch may be formed of rubber or an elastic material. The clutch may be attached to an axle or axle head. The clutch may be attached permanently or removable to an axle or axle head. The clutch may surround an entire circumference of an axle or axle head. The clutch may be located in one or more discrete areas on the axle and/or axle head. The clutch may be made of plastic, or a combination of a friction material and a spring located in a groove of an axle head and/or cone. The clutch may comprise a rubber or elastic material that is bendable, deflectable, deformable, elastic, resilient, or a combination thereof. As a non-limiting example, the spring may be a Belleville washer or any component that may act as a spring to allow deflection.

The power transfer mechanism may include one or more worms. The one or more worms may transfer power from a corresponding axle to a corresponding worm gear. The one or more worms may be any suitable transfer gear or mechanism for transferring power from the axle to a corresponding worm gear. The system may include two worm gears, one for each brake piston. During a parking brake apply, a parking brake release, or both, the worm gears may be adapted to rotate in the same direction, or preferably may rotate in opposing directions. For example, during a parking brake apply a first worm may be rotated in a counter clockwise direction, while the second worm may be rotated in a clockwise direction, or vice versa. Accordingly, during release of a parking brake the first worm may be rotated in a clockwise direction and the second worm may be rotated in a counter clockwise direction, or vice versa. The worm gear may engage a worm via teeth, or may engage the worm via any other suitable friction engagement.

The one or more rotary to linear stage mechanisms may be may be one or more high efficiency devices, one or more low efficiency devices, or both. However, preferably, all of the rotary to linear stages are high efficiency devices. A high efficiency device is a device that is more efficient than a low efficiency device. Efficiency may refer to how well, or how "efficiently" the device converts or transfers torque or a rotational load input into a linear load or output force. Depending on one or more considerations, such as lead angle and coefficient of friction, the one or more high efficiency devices may have an efficiency on the order of approximately 60% or more, approximately 70% or more, approximately 80% or more, approximately 85% or more, approximately 90% or more, approximately 95% or more, 97% or more, or even 99% or more. One or more rotary to linear stage mechanisms may correspond to each piston. One or more rotary to linear stage mechanisms may be in communication with a brake piston. The one or more low efficiency devices may include, a spindle and nut assembly.

The one or more high efficiency devices may be non-locking. In other words, because the coefficient of friction between the spindle and nut in a high efficiency device is generally low, back driving may occur when a reaction force applied to the spindle, the nut, or both, is greater than the static force or coefficient of friction of the high efficiency device. This may undesirably cause the spindle, nut, or both to rotate or move in an opposing direction after a clamping force has been created. Therefore, a mechanical brake or lock may be required to prevent back driving and thus sustain the linear output force and/or maintain the clamping force of the parking brake assembly. Without such a mechanical brake or lock, the high efficiency devices may undesirably, and prematurely, release the clamping force after the MGU is turned OFF. The brake may be located internally within the MGU to maintain the clamp force and prevent back driving.

For example, the one or more high efficiency devices may be one or more ball screws, roller screws, ball ramps, or a combination thereof. Exemplary ball screws may utilize ball bearings as load transfer elements between the nut and spindle or screw. During movement of the ball screw, the ball bearings may circulate along races or grooves between the spindle and the nut. A roller screw or planetary screw may be similar to a ball screw except that roller screws use rollers as the load transfer elements between nut and screw. The load on a ball screw, the roller screw, or both is distributed over a large number of ball bearings or rollers, via roller threads, respectively, so that each ball bearing or roller, when subjected to force, may roll, and therefore, friction is reduced, which may equate to high efficiency. Accordingly, less force or torque may be required to move a spindle and nut in a ball screw or roller screw in an apply direction, a release direction, or both. A ball ramp may include a rotating side and a stationary side with rolling elements interposed there between. A torque input causes the rotating side to rotate, which also causes the rolling elements to engage and move along ramps between the rotating side and stationary side. The ramps include a deep end and a shallow end. When the rotating side is rotated such that the rolling elements move to the shallow side of the ramp, the rolling elements provide an axial force against the stationary side, thus axially moving the stationary side.

The parking brake assembly may include one or more controllers. The controller may function to turn the motor ON and OFF. The controller may function to receive a signal to apply a parking brake, release a parking brake or both. When the controller receives a signal to apply or turn ON a parking brake, the controller may function to turn ON the motor to generate power. The controller may function to monitor the clamping force as it is being created, and may function to turn OFF the motor after a suitable clamping force or load has been created and/or detected. When the controller receives a signal to release the parking brake, the controller may function to turn ON the motor to generate power to release the clamping force. The signal to the controller may be provided by a suitable means, such as pushing a button, pulling a lever or cable. The signal may be provided automatically when a vehicle is placed in a parking gear, for example. The controller may be in communication with the parking brake assembly, the motor, the motor gear unit, or a combination thereof to control one or more functions thereof. The controller may communicate with the parking brake assembly, the motor, the motor gear unit, or a combination thereof by wire or wirelessly.

As used throughout the following description of the figures, the previous description, and the claims, the terms "first" and "second" are used by the Applicant for the reader to describe the features and operation associated with this disclosure. It is understood, however, that the usage of the terms "first" and "second" are not necessary limited to the features shown and described in the FIGS. 1-5, the previous description, and/or the following Claims. For example, the features and/or functions of the first brake piston may also or instead relate to the first brake piston, and vice-versa.

Figure 1:
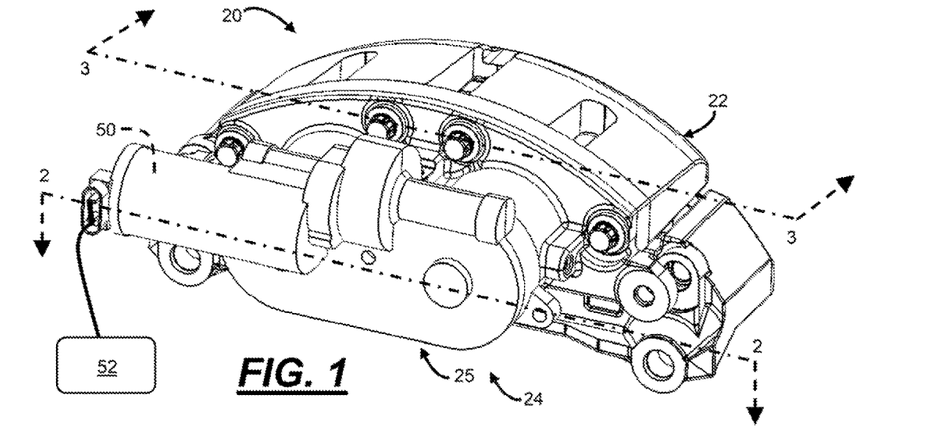
FIG. 1 is a perspective view of a brake assembly.

FIG. 1 is a perspective view of a brake assembly 20. The brake assembly 20 includes a brake caliper 22 and a parking brake assembly 24. The parking brake assembly 24 includes a motor gear unit 25 and a controller 52. The motor gear unit 25 includes a motor 50.

Figure 2:
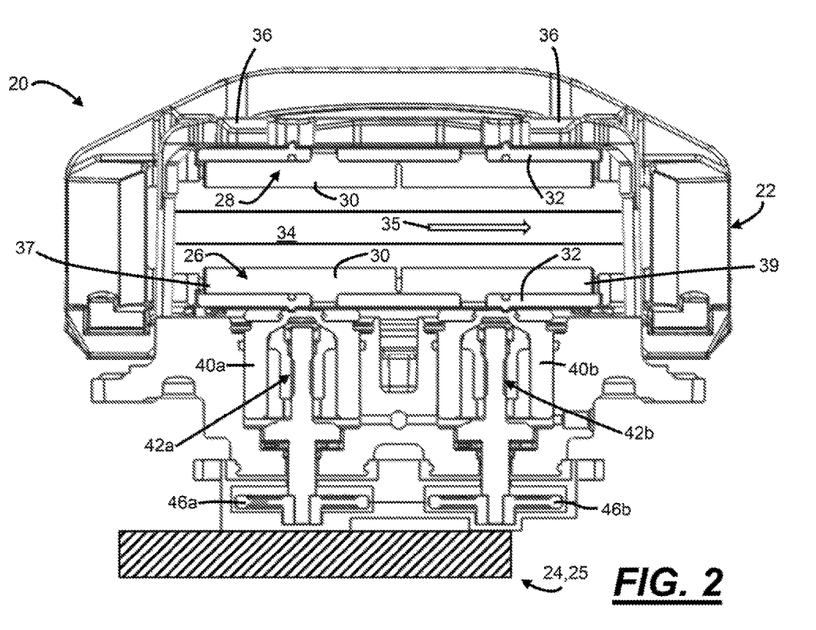
FIG. 2 is a cross-sectional view of the brake assembly taken along line 2-2 of FIG. 1.

FIG 2 is a cross-sectional view of the brake assembly 20 taken along line 2-2 of FIG. 1. The brake assembly 20 includes an inboard brake pad 26 and an outboard brake pad 28. Each brake pad 26, 28 includes a friction material 30 and a pressure plate 32. The brake pads 26, 28 are arranged so that the friction material 30 of each brake pad 26, 28 faces a side of a brake rotor 34. During a forward motion of a vehicle, the brake rotor 34 may rotate in a direction identified by arrow 35. The brake caliper 22 includes fingers 36 in contact the pressure plate 32 of the outboard brake pad 28. A first brake piston 40a is located near a first or leading end 37 of the inboard brake pad 26, and a second brake piston 40b is located near a second or trailing end 39 of the inboard brake pad 26. A first rotary to linear stage mechanism 42a is in communication with both the first brake piston 40a and a first worm gear 46a such that when the first worm gear 46a is rotated the first rotary to linear stage mechanism 42a is adapted to move first brake piston 40a. A second rotary to linear stage mechanism 42b is in communication with both the second brake piston 40b and a second worm gear 46b such that when the second worm gear 46b is rotated the second rotary to linear stage mechanism 42b is adapted to move the second brake piston 40b.

Figure 3:
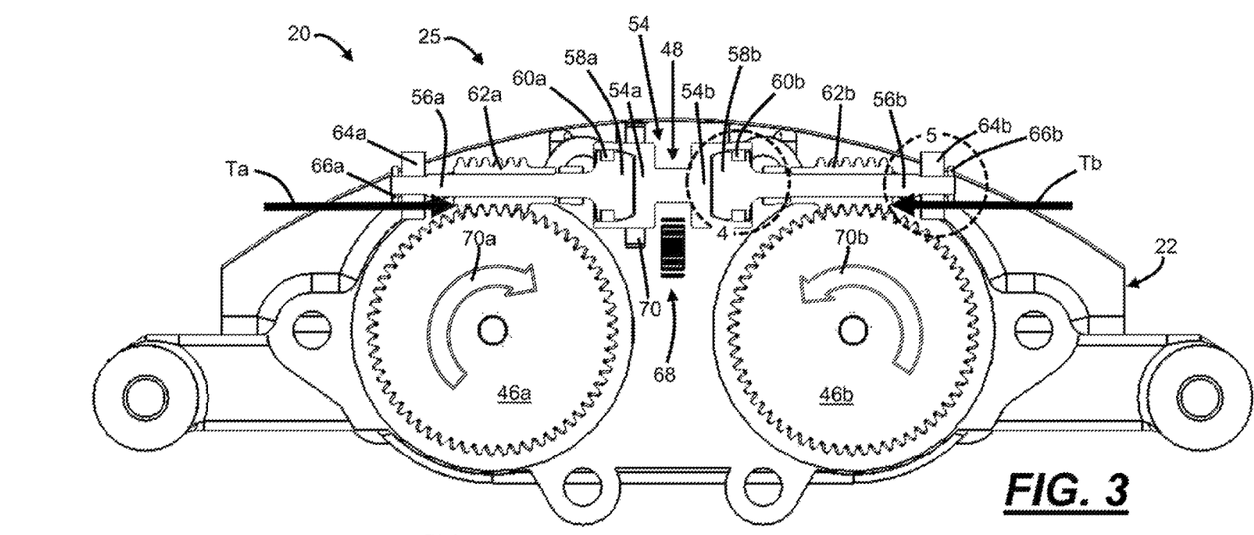
FIG. 3 is a cross-sectional view of the brake assembly taken along line 3-3 of FIG. 1.

FIG. 3 is a cross-sectional view of the brake assembly 20 taken along line 3-3 of FIG. 1. The motor gear unit 25 includes worm wheels 46a, 46b, a power transfer mechanism 48, and the motor 50 (See FIG. 1). The power transfer mechanism 48 includes a conical component 54 that includes opposing cones 54a, 54b; a pair of axles 56a, 56b; and a pair of axle heads 58a, 58b. Each axle head 58a, 58b or cone 54a, 54b, or a combination thereof includes a clutch, 60a, 60b. The first axle 56a includes a first worm 62a in communication with the first worm gear 46a such that when the first axle 56a is rotated, the first worm gear 46a also rotates. The second axle 56b includes a second worm 62b in communication with the second worm gear 46b such that when the second axle 56b is rotated, the second worm gear 46b also rotates. Each axle 56a, 56b includes a bearing 64a, 64b and a stopper 66a, 66b. The power transfer mechanism 48 is in communication with a gear train 68 that includes various gears including a spur gear 70. An output of the motor 50 (FIG. 1) is in communication with the gear train 68.

FIG. 4 illustrates a close-up view of the second cone 54b and the second axle head 58b. The second cone 54b includes a first portion 80b that can be engaged by the second clutch 60b in a first operating stage, and a second portion 82b that can be engaged via cone-to-cone contact by the second axle head 58b in a second operating stage. The first cone 54a and the first axle head 58a may be symmetrically opposite the second cone 54b and the second axle head 58a. A gap Gb1 is defined between, an edge 76b of the second cone 54b and an edge 78b of the second axle head 58b. The gap Gb1 exists during both the first and second operating stages; however, the size of the gap Gb1 varies between the first and second operating stages. That is, the size of the gap Gb1 may be larger in the first operating stage than the size of the gap Gb1 the second operating stage.

Figure 5:
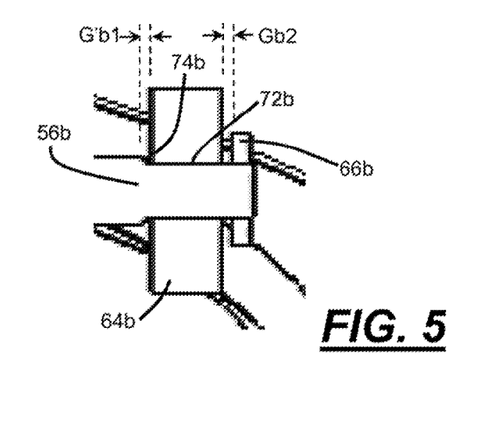
FIG. 5 is a close-up view of a portion of the parking brake assembly of FIG. 3 at 5.

FIG. 5 illustrates a close-up view of a portion of the second axle 54b, which includes a recessed or narrowed portion 72b where the second bearing 64b is located. The second axle 54b includes an edge 74b. A gap G'b1 is defined between the edge 74b and the second bearing 64b. Another gap Gb2 is defined between the stopper 66b and the second bearing 64b. While not shown, it is understood that the first axle 54a includes a corresponding recessed or narrowed portion, and a gap between an edge of the recessed or narrowed portion and the first bearing 64a and another gap between the first stopper 66a and the first bearing 64a.

With reference to FIGS. 1-5, an operation or method of applying a parking brake will be described. It is understood that the method steps described throughout this disclosure can be performed in virtually any order, and one or more of the steps described herein may be omitted or repeated. During steady state before the parking brake is applied a gap may be defined between the brake pistons 40a, 40b and the pressure plate 32 of the inboard brake pad 26. Due to taper wear, a gap between the second brake piston 40b and the pressure plate 32 may be less than a gap between the first brake piston 40a and the pressure plate 32.

A signal may he transmitted by the controller 52, which may cause the motor 50 to start rotating. The output of the motor 50 is in communication with the gear train 68 so that the power from the motor 50 causes the spur gear 70 to rotate in an apply direction. Rotation of the spur gear 70 in the apply direction causes the conical component 54 to rotate in an apply direction. The clutches 60a, 60b of the axle heads 58a, 58b become frictionally engaged with the first portions of the corresponding cones 54a, 54b so that when the conical component 54 is rotated in the apply direction both axles 56a, 56b rotate together in an apply direction. Via the engagement of the worms 62a, 62b and the corresponding worm gears 46a, 46b, rotation of the axles 56a, 56b in the apply direction causes the corresponding worm gears 46a, 46b to rotate in the apply directions, which are indicated by the respective reference numerals 70a, 70b. Rotation of the worm gears 46a, 46b in the apply direction 70a, 70b causes the corresponding rotary to linear stage mechanisms 42a, 42b to move the corresponding brake pistons 40a 40b towards the pressure plate 32 of the inboard brake pad 26 to eliminate and/or take up, gaps there between.

Because the gap between the second brake piston 40b and the pressure plate 32 (i.e., the trailing end) is less than the gap between the first brake piston 40a and the pressure plate 32 (i.e., the leading end), the gap at the trailing end between the second brake piston 40b and the pressure plate 32 is eliminated or taken up first. After the trailing end gap is eliminated, continued rotation of the second axle 56b (the first axle 56a is also correspondingly rotated at this point) results in an increased thrust force Tb at the second axle 56b, which causes the second axle 56b to axially move in a direction towards the second cone 58b (i.e., towards the left when viewing FIG. 3) until the gap Gb2 between the second bearing 64b and the second stopper 66b is taken up or eliminated. Once eliminated, the second stopper 66b restricts further movement of the second axle 56b to the left. The second stopper 66b therefore opposes the full thrust load Tb developed by the second axle 56b via the second clutch 60b and the second cone 54b. Movement of the second axle 56b to the left also causes both the first axle 56a and the conical component 54 to axially move to the left until the second clutch 60b slips thus allowing the second axle 56b and second cone 54b to at least partially frictionally disengage so that the second brake piston 40b is no longer moved. Meanwhile, the first axle 56a and the first cone 58a remain frictionally engaged via the first clutch 60a so that the first brake piston 40a continues to be moved towards the inboard brake pad 26. Eventually, the leading end gap is also eliminated.

With the conical component 54 shifted to the left, continued rotation of the conical component in the apply direction causes the second clutch 60b to slip so that the second axle 56b no longer rotates with the conical component 54 and thus the second brake piston 40b ceases to move. However, the frictional engagement between the first clutch 60a and the first cone 54a is maintained so that the first axle 58a continues to rotate in the apply direction. As the conical component 54 continues to be rotated in the apply direction, power is transferred to only the first axle 56a so that additional power is supplied to the first brake piston 40a, which continues to move until the gap between the first brake piston 40a and the pressure plate 32 is eliminated or taken up.

After both the leading and trailing end gaps are eliminated, during the second or higher-load stage continued rotation of the first axle 56a results in an increase in the first thrust load Ta at the first axle 56a causing the first axle 56a to move axially in a direction towards the first cone 58a (e.g., towards the right when viewing FIG. 3) and also causes both the second axle 56b and the conical component 54 to move axially to the right. The opposing first and second thrust forces Ta, Tb continue to increase thus resulting in the first and second axles 56a, 56b being axially moved towards one another deeper into the corresponding cones 58a,58b while deflecting the clutches 60a, 60b until cone-to-cone contact is made between the second portion 82b of the second cone 54b and the second axle head 58b and the corresponding portion of the first cone 54a and first axle head 58a. With cone-to-cone contact at both respective axles heads 58a, 58b and cones 54a, 54b, continued rotation of the conical component 54 causes both axles 56a, 56b to again rotate together as a single, solid axle so that both brake pistons 40ab 40b move the corresponding ends of the inboard brake pad 26 against the brake rotor 34 to develop the clamping force. As the clamping force increases corresponding to the movement of the brake pistons 40a, 40b and the inboard brake pad 26 against the rotor 34, the clamping force is monitored, and once a desired clamping force is achieved, the motor may cease rotating the conical component 54.

It is understood that the power or torque required to rotate the axles 56a, 56b is higher than the torque sum at the worms 62a, 62b and the corresponding worm gears 46a, 46b so that the axles 56a, 56b are prevented from slipping. Any difference between the thrust forces Ta and Tb may be supported by one of the bearings 64a, 64b. If the difference in thrust forces Ta and Tb becomes too large, slippage may occur between a cone 54a, 54b and a corresponding axle 56a, 56b. Any slip will act to reduce the difference in thrust forces Ta, Tb so there is little to no noticeable drop in clamp force on the side that slip occurs.

With reference to FIGS. 1-5, operation of releasing or disengaging the parking brake will be described. It is understood that the method steps described herein can he performed in virtually any order, and one or more of the steps described herein may be omitted or repeated. The steps to release or disengaging the parking brake can be substantially opposite the steps to apply or engage the parking brake. Before the parking brake is released, it is understood that no gaps exist between the brake pistons 40a, 40b and the pressure plate 32 of the inboard brake pad 26.

A signal may be transmitted by the controller 52, which may cause the motor 50 to rotate. An output of the motor 50 is in communication with the gear train 66 so that the power from the motor 50 causes the spur gear 70 to rotate in a release direction. The release direction as used herein is opposite the apply direction discussed herein. Rotation of the spur gear 70 in the release direction causes the conical component 54 to rotate in a release direction. The axle heads 58a, 58b are frictionally engaged with the cones 54a, 54b of the conical component 54 as described in the apply section above, so that both axles 56a, 56b rotate together in a release direction when the power conical component 54 is rotated in the release direction. Accordingly, the brake pistons 40a, 40b are moved away from the inboard brake pad 26 and the inboard brake pad 26 moves away from the brake rotor 34 thus decreasing the clamping force. As the clamping load decreases, the thrust loads Ta and Tb also decrease, thus the contact force between the axle heads 58a, 58b and the cones 54a, 54b is proportionally reduced until it is eliminated. When the contact force between the axle cones 58a, 58b and the cones 54a, 54b is eliminated, the clutches 60a, 60b continue to be frictionally engaged with the corresponding cones 54a, 54b so that both axles 56a, 56b continue to rotate together in a release direction. Via the engagement of the worm 62a, 62b and the corresponding worm gear 46a, 46b, rotation of the axles 56a, 56b in the release direction cause the corresponding worm gear 46a, 46b to rotate in a release direction, which is opposite the directions 70a, 70b illustrated in FIG. 3. Rotation of the worm gears 46a, 46b in the release direction causes the corresponding rotary to linear stage mechanisms 42a, 42b to move away from the corresponding brake pistons 40a, 40b so that the brake pistons 40a 40b move away from the pressure plate of the inboard brake pad 26 thus releasing the clamping force and the parking brake.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85. 22 to 68, 43 to 51, 30 to 32 etc. are expressly enumerated in this specification. For values which are less than one, one unit is considered to be 0,0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Teachings of a range in terms of at "x" parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the, teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:
1. A brake assembly comprising:
 a. a first brake piston;
 b. a second brake piston; and
 c. a power transfer mechanism;

wherein during a parking brake apply or during a service brake apply, the power transfer mechanism provides power from a motor or to both the first brake piston and the second brake piston so that both the first brake piston and the second brake piston are moved until a resistance of the second brake piston becomes higher than a resistance of the first brake piston, the power transfer mechanism then transfers he power to the first brake piston so that the second brake piston ceases to move and additional power is supplied to the first brake piston, and wherein the power transfer mechanism comprises a first cone and a second cone that face away from each other.

2. The brake assembly of claim 1, wherein the first cone is fictionally engageable with a first axle that is in communication with the first brake piston, and the second cone is frictionally engageable with a second axle that is in communication with the second brake piston, and wherein when the power transfer mechanism provides the power to both the first brake piston and the second brake piston, the first axle and the first cone are frictionally engaged and the second axle and the second cone are frictionally engaged so that the first axle and the second axle are rotated together.

3. The brake assembly of claim 2, wherein when the resistance of the second brake piston becomes higher than the resistance of the first brake piston, the second axle and the second cone slip so that the power ceases to be provided to the second brake piston while the first axle and the first cone remain frictionally engaged so that the additional power is supplied to the first brake piston.

4. The brake assembly of claim 2, wherein the first axle includes a clutch that frictionally engages an inside of the first cone, and the second axle includes a clutch that frictionally engages an inside of the second cone.

5. The brake assembly of claim 2, wherein the first axle includes a first worm that engages a first worm gear, the first worm gear is in communication with a first rotary to linear stage mechanism that is in communication with the first brake piston, and the second axle includes a second worm that engages a second worm gear, the second worm gear is in communication with a second rotary to linear stage mechanism that is in communication with the second brake piston.

6. The brake assembly of claim 5, wherein the first rotary to linear stage mechanism, the second rotary to linear stage mechanism, or both comprises a ball ramp, a ball screw, or a planetary screw.

7. The brake assembly of claim 1, wherein the first cone is frictionally engageable with a first axle that is in communication with the first brake piston, and the second cone is frictionally engageable with a second axle that is in communication with the second brake piston.

8. The brake assembly of claim 1, wherein the first cone is frictionally engageable with a first axle that is in communication with the first brake piston, and the second cone is frictionally engageable with a second axle that is in communication with the second brake piston.

9. A brake assembly comprising:
a. a first brake piston;
b. a second brake piston; and
c. a power transfer mechanism;
wherein the power transfer mechanism comprises:
i. a first cone, the first cone is frictionally engageable with a first axle, the first axle is in communication with the first brake piston; and
ii. a second cone, the second cone is frictionally engageable with a second axle, the second axle is in communication with the second brake piston;

wherein during a brake apply, the first cone is frictionally engaged with the first axle and the second cone is fictionally engaged with the second axle so that the power transfer mechanism provides power to both the first axle and the second axle so that both the first brake piston and the second brake piston are moved until a resistance of the second brake piston becomes higher than a resistance of the first brake piston, and wherein when the resistance of the second brake piston becomes higher than the resistance of the first brake piston, engagement between the second axle and the second cone slips so that power ceases to be provided to the second axle and the second brake piston ceases to move while additional power is supplied to the first axle and the first brake piston so that the first brake piston continues to move.

10. The brake assembly of claim 9, wherein the brake apply is a parking brake apply and the power is provided by a motor, and during a standard brake apply, the first brake piston and the second brake piston are moved by pressurizing a fluid.

11. The brake assembly of claim 9, wherein the first axle includes a first worm that is in direct communication with a first worm gear, the first worm gear is in direct communication with a first rotary to linear stage mechanism that is in direct communication with the first brake piston, and the second axle includes a second worm that is in direct communication with a second worm gear, the second worm gear is in direct communication with a second rotary to linear stage mechanism that is in direct communication with the second brake piston.

12. The brake assembly of claim 11, wherein both the first cone and the second cone are located between the first worm gear and the second worm gear.

13. The brake assembly of claim 11, wherein the brake assembly is a disc brake assembly.

14. The brake assembly of claim 11, wherein the first brake piston is located at a leading end of an inboard brake pad, and the second brake piston is located at a trailing end of the inboard brake pad.

15. The brake assembly of claim 9, wherein a first thrust force acting on the first cone causes the first cone and the first axle to frictionally engage, and a second thrust force acting on the second cone causes the second cone and the second axle to frictionally engage so that the first axle and the second axle are locked together so that both the first axle and the second axle rotate and both the first brake piston and the second brake piston are moved.

16. A method of applying a service brake or a parking brake, the method comprising:
providing power to both a first brake piston and a second brake piston so that both of the first brake piston and the second brake piston are moved, and
transferring the power from the second brake piston to the first brake piston with a power transfer mechanism when a resistance of the second brake piston becomes higher than a resistance of the first brake piston so that the second brake piston ceases to move and additional power is supplied to the first brake piston,
wherein the power transfer mechanism comprises a first cone and a second cone, the first cone is engageable with a first axle that is in communication with the first brake piston, and the second cone is engageable with a second axle that is in communication with the second brake piston.

17. The method of claim 16, wherein during the providing step, the first cone is frictionally engaged with the first axle and the second cone is frictionally engaged with the second axle so that the power transfer mechanism provides the power to both the first brake piston and the second brake piston.

18. The method of claim 17, wherein when the resistance of the second brake piston becomes higher than the resistance of the first brake piston, the second axle and the second cone frictionally disengage while the first axle and the first cone remain frictionally engaged so that the additional power is supplied to the first brake piston.

19. The method of claim 16, wherein
during the providing step, the first cone is frictionally engaged with the first axle and the second cone is frictionally engaged with the second axle so that the power transfer mechanism provides the power to both the first brake piston and the second brake piston so that both the first brake piston and the second brake piston are moved, and
when the resistance of the second brake piston becomes high than the resistance of the first brake piston, the second axle and the second cone frictionally disengage while the first axle and the first cone remain frictionally engaged so that the additional power is supplied to the first brake piston.

20. The method of claim 19, wherein the first axle includes a first worm that is in direct communication with a first worm gear, the first worm gear is in direct communication with a first rotary to linear stage mechanism that is in direct communication with the first brake piston, and the second axle includes a second worm that is in direct communication with a second worm gear, the second worm gear is in direct communication with a second rotary to linear stage mechanism that is in direct communication with second brake piston.

* * * * *

UNITED STATES PATENT AND TRADEMARK OFFICE
CERTIFICATE OF CORRECTION

PATENT NO.         : 9,989,114 B2
APPLICATION NO.    : 15/192461
DATED              : June 5, 2018
INVENTOR(S)        : Galus Chelaidite Page 1 of 1

It is certified that error appears in the above-identified patent and that said Letters Patent is hereby corrected as shown below:

In the Claims

Column 17, Line 8, Claim 1 delete "transfers he power" and insert --transfers the power--

Column 20, Line 4-5, Claim 19 delete "becomes high than" and insert --becomes higher than--

Signed and Sealed this
Sixteenth Day of October, 2018

Andrei Iancu
*Director of the United States Patent and Trademark Office*